(12) United States Patent
Hung

(10) Patent No.: US 7,388,629 B2
(45) Date of Patent: Jun. 17, 2008

(54) GENERAL-PURPOSED LCD PANEL

(75) Inventor: Meng-Yi Hung, Gueishan Township, Taoyuan County (TW)

(73) Assignee: AU Optronics Corporation, Hsin-Chu (TW)

( * ) Notice: Subject to any disclaimer, the term of this patent is extended or adjusted under 35 U.S.C. 154(b) by 299 days.

(21) Appl. No.: 11/314,829

(22) Filed: Dec. 21, 2005

(65) Prior Publication Data

US 2006/0139514 A1 Jun. 29, 2006

(30) Foreign Application Priority Data

Dec. 28, 2004 (TW) .............................. 93140936 A

(51) Int. Cl.
*G02F 1/1335* (2006.01)
(52) U.S. Cl. .................... 349/106; 349/104; 349/108
(58) Field of Classification Search ................ 349/104, 349/106, 107, 108, 109, 127, 128, 122
See application file for complete search history.

(56) References Cited

U.S. PATENT DOCUMENTS

| | | | | |
|---|---|---|---|---|
| 6,072,557 A | * | 6/2000 | Kishimoto | 349/156 |
| 6,310,672 B1 | | 10/2001 | Koike et al. | 349/106 |
| 6,417,901 B1 | * | 7/2002 | Okada et al. | 349/113 |
| 6,529,255 B1 | * | 3/2003 | Sekiguchi | 349/113 |
| 7,019,803 B2 | * | 3/2006 | Ashida et al. | 349/114 |
| 7,030,946 B2 | * | 4/2006 | Iijima et al. | 349/106 |
| 2004/0169793 A1 | | 9/2004 | Ino et al. | 349/106 |
| 2006/0139514 A1 | * | 6/2006 | Hung | 349/106 |

FOREIGN PATENT DOCUMENTS

| | | |
|---|---|---|
| CN | 1537254 | 10/2004 |
| JP | 2003233063 | 8/2003 |

* cited by examiner

*Primary Examiner*—Brian M Healy
(74) *Attorney, Agent, or Firm*—Kusner & Jaffe

(57) ABSTRACT

Transparent regions are allocated on the color filter regions to promote luminance of LCD devices. Shielding regions are allocated on the pixels regions of TFT substrate corresponding to the transparent regions to promote chromatics. These two designs can be adapted to both display devices for laptop computers with high luminance requirement and desktop computers with pure chromatics requirement.

19 Claims, 1 Drawing Sheet

GENERAL-PURPOSE LCD PANEL

BACKGROUND OF THE INVENTION

1. Field of the Invention

The present invention generally relates to a liquid crystal display panel, particularly liquid crystal display device for both laptop computer and desktop computer.

2. Description of the Prior Art

Liquid crystal display (LCD) devices are used for display device of portable laptop computers. However, one major issue for the portable laptop computer is the power consumption. The longer battery lifetime is the more convenient and widely efficient for users who use a laptop computer. Battery capacity of a laptop computer nowadays is about between three to five hours, even up to seven hours for some certain models. The major devices that consume most power are the processor, chipsets, hard disk, and LCD device.

High luminance back light plates are not used for LCD devices of laptop computers in order to reduce power consumption. Nevertheless, luminance or luminance of display devices will be diminished according to such design. One solution is to lower the thickness of color filter films. The reason is because color filter films will not only filter lights but also absorb light to lower luminance. Chromatics will also diminish with thinner color filter films. Another solution is to increase the aperture ratio of a pixel, but more complex manufacturing processes and designs will have to be incurred.

Alternatively, LCD devices are also used for as monitors of desktop computers. Power consumption will not be an issue, and high luminance back light plates can be used as light sources to promote chromatics of color filter films. A simple way to increase chromatics is to increase the thickness of color filter films. However, such a solution can not be suitable for laptop computers.

Hence, one liquid crystal display device will have two different, opposite designs to apply for laptop computers and desktop computers. While manufacturing the two kinds of LCD panels, different specifications for color filter films of the same LCD panel size are needed. Thus, one design is not available for the two applications.

SUMMARY OF THE INVENTION

For the invention background mentioned above, the conventional LCD panels create many problems. The main object of this invention is to provide a general-purposed LCD panel with transparent regions free of color filter in color filter film regions. Luminance can be promoted when LCD panels are applied to laptop computers. Chromatics can also be increased for desktop computers when shielding regions are formed on the substrate with the thin film transistors.

It is another object of this invention that no extra power is applied when luminance is increased, and hence no further power consumption is incurred.

It is a further object of this invention that one color filter substrate can be applied to different requirements of LCD devices to make one element fit to divers devices According to the objects above, this invention provides a general-purposed liquid crystal display panel which comprises a first substrate, a second substrate, and a liquid crystal layer between the first and second substrates. A plurality of thin film transistors are formed on the first substrate and color filter films are formed on the second substrate, wherein the color filter films have a plurality of transparent regions free of color filter thereon.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
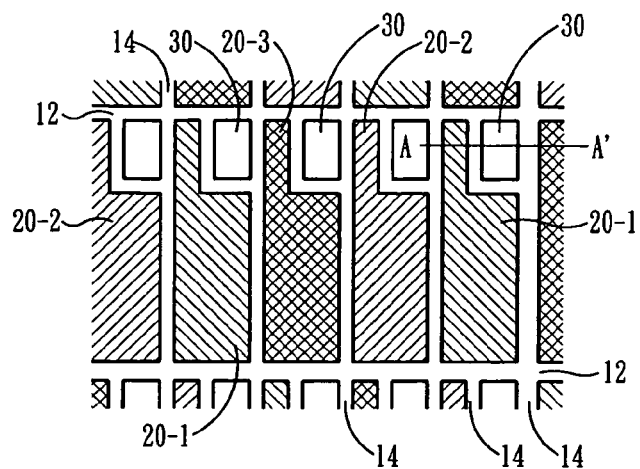
FIG. 1 illustrates a schematic representation of a top view of color filter substrate with transparent region free of color filter thereon dispersed on the color filter.

Some sample embodiments of the present invention will now be described in detail. Nevertheless, it should be recognized that the present invention can be practiced in a wide range of other embodiments besides those explicitly described, and the scope of the present invention is expressly not limited except as specified in the accompanying claims.

Moreover, the dimensions of drawings are only for reference as they have been exaggerated and simplified.

Only less than 50 percent light can reach user's eyes from backlight sources in general LCD devices. Thus, luminance of LCD devices can not compete with conventional CRT (cathode ray tube) display devices. A major cause is that the light from back light source of LCD devices will pass through two glass substrates, liquid crystal molecules, alignment films, polarization films, and color filter films to users, wherein the color filter films not only filter out colors, but also decrease light intensity. Hence, it can be predicted that LCD devices will have lower brightness or luminance.

In order to resolve such an issue, a straight forward step is to increase intensity of back light source, but power consumption is incurred. Alternative application of LCD device is for portable laptop computer. However, power provided by batteries for portable device, such as laptop computer, can not permanently supply like what desktop computers. A conventional method to increase luminance of LCD device is to reduce light filtering; that is, reduced thickness of color filter films will directly increase luminance. Nevertheless, other drawbacks will be incurred. But for LCD device design will be more complex according to different applications, the reduced thickness of color filter films will decrease chromatics directly. Hence, alternative solution for application on laptop computer has to be provided on the luminance issue.

This LCD panel on application of laptop computer provided by this invention designs transparent regions free of color filter therein in color filter regions, such that white light will reach users without passing through color filter. Areas of transparent regions free of color filter should be made so that users will have benefit from improved LCD panel luminance. Chromatics will not be affected and will be even better than present laptop computer in comparison with none reduced thickness of color filter film.

When LCD devices are applied to desktop computer, the transparent regions free of color filter are of no use according to higher intensity back light source. The other substrate of LCD device is designed shielding regions to cover the transparent regions free of color filter thereon. The designed LCD panel will also suffice requirement of chromatics.

The LCD panel provided by this invention can be called as a general-purpose LCD panel because it applies to both laptop computer and desktop computers.

The area of one transparent region free of color filter should be less than one fourth of a pixel. Further, the transparent regions free of color filter in the three colors of color filter films can be different; the area of one transparent region free of color filter can be adjusted according to one color.

The shielding regions, which do not need to be formed independently, can be formed with the process of formation of thin film transistors (TFTs). For example, the shielding regions can be formed with metal gate, source/drain or bus line. The areas of transparent regions free of color filter can be adjusted by the area of shielding regions.

The general-purpose LCD panel provided by this invention comprises a first substrate, a second substrate, and a liquid crystal layer between the first substrate and the second substrate. The first substrate comprises a plurality of thin film transistors and the second substrate comprises color filter films in which the color filter films have transparent regions free of color filter thereon.

The transparent regions free of color filter are designed so that each pixel will have one transparent region free of color filter. The area of one transparent region free of color filter is preferred to be less than one fourth of a pixel.

The color filter films are red color filter films, green color filter films, and blue color filter films. The areas of transparent regions free of color filter on the red color filter film, green color filter film, and blue color filter film can be the same, different, or two of which are the same. For example, the areas of transparent regions free of color filter can be the same in red and green color filter films, green and blue color filter films, or blue and green color filter films. The area of transparent region free of color filter in blue color filter film can be less than that in red or green color filter film. The main purpose of adjusting areas of transparent regions free of color filter in each color filter film is to make LCD devices generate uniform white light.

A plurality of shielding regions can be designed on the first substrate corresponding to the plurality of transparent regions free of color filter. The plurality of shielding regions can be formed with gates or sources/drains of the thin film transistors.

One embodiment of this invention will be explained in accordance with figures. Please refer to FIG. 1, a top view of a plurality of color filter films and transparent regions free of color filter is shown, wherein the color filter films can also name as color deposition layers. Usual color filter films have red, green, and blue color filter films. The first color filter region 20-1, second color filter region 20-2, and third color filter region 20-3 can be represented as red, green, and blue color filters. However, this does not mean the first color filter region 20-1, second color filter region 20-2, and third color filter region 20-3 have to be red, green, and blue color filters. The thickness of color filter films does not necessary be reduced in this invention due to luminance. A normal thickness of color filter films can be applied to provide preferred chromatics. Each color filter films region 20 corresponds to a pixel. A transparent region free of color filter 30 is allocated in each color filter films region 20. Black matrices 12, 14 are used to separate each color filter films region 20 and the transparent region free of color filter 30. The black matrix 12 is aligned horizontally and the black matrix 14 is aligned vertically.

Area of the transparent region free of color filter 30 is preferred to be less than one fourth of a pixel. The areas of transparent regions free of color filter 30 can be the same, different, or two of which are the same. For example, the areas of transparent regions free of color filter 30 can be the same in red, green, and blue color filter films, such as one fourth or one fifth of a pixel, or other possible ratio. The areas of transparent regions free of color filter 30 can be the same in two of three color filter regions, such as the same area in red and green color filter films, green and blue color filter films, or blue and green color filter films. The areas of transparent regions free of color filter 30 can be different in all three color filter regions. A preferred way is to design areas of transparent regions free of color filter 30 to fit with human's vision. For example, human vision sensitivity is weak to blue, and then the area of transparent region free of color filter 30 in the blue color filter region 20 will be smaller. Further, human vision is sensitive to green, and the area of transparent region free of color filter 30 in the green color filter region 20 can be larger to provide perfect quality of chromatics.

Figure 2:
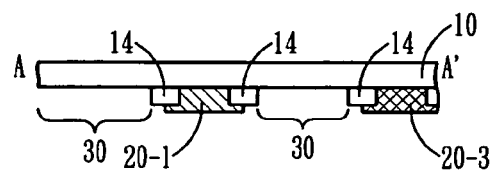
FIG. 2 illustrates a schematic representation of a cross-sectional view of the transparent region free of color filter thereon shown in FIG. 1 along line A-A'.

FIG. 2 shows a sectional view along AA' in FIG. 1. Color filter 20 and black matrix 14 are on a transparent substrate 10 in FIG. 2. The transparent region free of color filter 30 is located between two black matrices 14. The substrate 10 with color filter 20 formed thereon is called color filter substrate 10. The name color filter substrate 10 is used to distinguish the other substrate in this embodiment.

Figure 3:
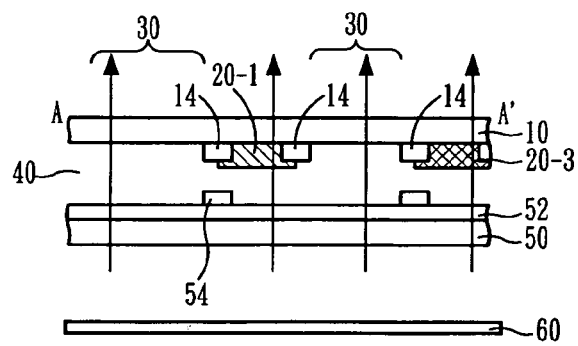
FIG. 3 illustrates a schematic representation of a cross-sectional view of formulation of luminance while color filter substrate is combined with TFT substrate.

Please refer to FIG. 3, a side view schematic representation of liquid crystal display device with color filter substrate shown in FIG. 2. Back light plate 60 provides a plain, uniform white light source in FIG. 3. Liquid crystal display panel comprises color filter substrate 10 and another substrate 50. The substrate 50 is usually called TFT (thin film transistor) substrate because there are both a plurality of TFTs as switches for pixels of liquid crystal display device and bus lines 54 connecting sources and gates of the TFTs thereon. A passivation layer 52 on the TFT substrate 50 protects TFTs and bus lines 54. A portion of lights from the back light plate 10 will reach user's eyes through the transparent region free of color filter thereon 30 on the color filter substrate 10, so luminance is increased. The other lights through the color filter regions 20 will constitute colors and shapes of the pixel. By using the transparent region free of color filter 30, luminance can be increased without increasing power consumption in this invention.

Figure 4:
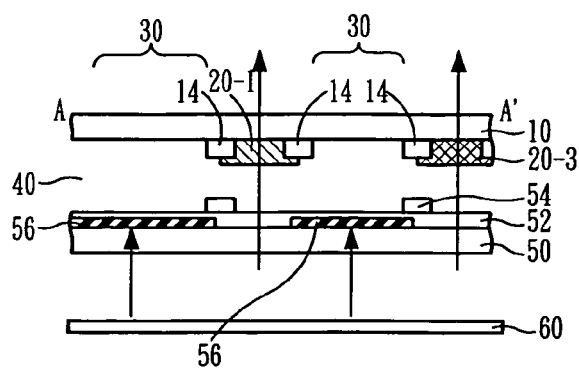
FIG. 4 illustrates a schematic representation of a cross-sectional view of formulation of chromatic while color filter substrate is combined with TFT substrate.

Please refer to FIG. 4, a schematic representations of another side view of color filter substrate of a liquid crystal display device shown in FIG. 2. A shielding region 56 on the TFT substrate 50 to shield or cover all or a portion of lights through the transparent region free of color filter 30. The design is used for LCD device of desktop computers, and the transparent region free of color filter 30 is no more necessary to increase luminance due to no power consumption issue.

The shielding region 56 can be metal or other kind of good opaque dielectric. Metal would be preferred for it can be formed with TFT process. For example, the shielding region 56 can be formed with the gates, bus line 56, or sources/drains. The formation of the shielding region 56 can be general thin film formation process.

In this invention, luminance or luminosity can be increased without providing further power to display device by using transparent regions free of color filter thereon. Furthermore, chromatic can also be kept when power consumption is not an issue, and the LCD panel can be applied to general desktop computer while shielding regions are designed on the TFT substrate, corresponding to the transparent regions free of color filter thereon. That is, the transparent regions free of color filter thereon designed in this invention can be applied no matter what backend applications will be to make one component fit to both applications.

Although specific embodiments have been illustrated and described, it will be obvious to those skilled in the art that various modifications may be made without departing from what is intended to be limited solely by the appended claims.

What is claimed is:

1. A general-purposed liquid crystal display panel, comprising:
    a first substrate with a plurality of thin film transistors thereon;
    a second substrate with color filter films and black matrixes thereon, wherein said second substrate comprises a plurality of transparent regions free of color filter and a plurality of color-filtered regions with color filter films thereon, each single pixel region is defined as a region having a single transparent region and a single color-filtered region, said single color-filtered region and said single transparent region within said single pixel region are separated by one of said black matrixes; and
    a liquid crystal layer between said first substrate and said second substrate.

2. The general-purposed liquid crystal display panel according to claim 1, wherein area of said one transparent region free of color filter is about less than or equal to one fourth of area of said single pixel region.

3. The general-purposed liquid crystal display panel according to claim 1, wherein said color filter films comprise a red color filter film, a green color filter film, and a blue color filter film.

4. The general-purposed liquid crystal display panel according to claim 3, wherein said plurality of transparent regions free of color filter has the same area among said red color filter film, green color filter film, and blue color filter film.

5. The general-purposed liquid crystal display panel according to claim 3, wherein said plurality of transparent regions free of color filter in said blue color filter films has less area than in said red color filter films.

6. The general-purposed liquid crystal display panel according to claim 3, wherein said plurality of transparent regions free of color filter in said blue color filter films has less area than in said green color filter films.

7. The general-purposed liquid crystal display panel according to claim 3, wherein areas of said plurality of transparent regions free of color filter among said red color filter film, green color filter film, and blue color filter film are different such that uniform white light can be generated by said liquid crystal display panel.

8. The general-purposed liquid crystal display panel according to claim 1, wherein said first substrate comprises of a plurality of shielding regions corresponding to said plurality of transparent regions free of color filter.

9. The general-purposed liquid crystal display panel according to claim 8, where said plurality of shielding regions are formed at stage of gates formation of said plurality of thin transistors.

10. The general-purposed liquid crystal display panel according to claim 8, where said plurality of shielding regions are formed at stage of sources/drains formation of said plurality of thin transistors.

11. The general-purposed liquid crystal display panel according to claim 8, wherein area of said one transparent region free of color filter is about less than or equal to one fourth of area of said single pixel region.

12. The general-purposed liquid crystal display panel according to claim 8, wherein said color filter films comprise a red color filter film, a green color filter film, and a blue color filter film.

13. The general-purposed liquid crystal display panel according to claim 12, wherein said plurality of transparent regions free of color filter has the same area among said red color filter film, green color filter film, and blue color filter film.

14. The general-purposed liquid crystal display panel according to claim 12, wherein said plurality of transparent regions free of color filter in said blue color filter films has less area than in said red color filter films.

15. The general-purposed liquid crystal display panel according to claim 12, wherein said plurality of transparent regions free of color filter in said blue color filter films has less area than in said green color filter films.

16. The general-purposed liquid crystal display panel according to claim 12, wherein areas of said plurality of transparent regions free of color filter among said red color filter film, green color filter film, and blue color filter film are different such that uniform white light can be generated by said liquid crystal display panel.

17. A general-purposed liquid crystal display device, comprising:
    a color filter substrate having a plurality of transparent regions free of color filter and a plurality of color-filtered regions with color filter films thereon, each single pixel region is defined as a region having a single transparent region and a single color-filtered region, said single color-filtered region and said single transparent region within said single pixel region are separated by one of said black matrixes;
    a thin film transistor substrate having a plurality of shielding regions and each of said shielding regions being corresponding to each of said plurality of transparent regions free of color filter;
    a liquid crystal layer between said color filter substrate and said thin film transistor substrate; and
    a back light source at one side of said thin film transistor substrate to provide light.

18. The general-purposed liquid crystal display panel according to claim 1, wherein said single pixel region is immediately surrounded by one of said black matrixes.

19. The general-purposed liquid crystal display panel according to claim 17, wherein said single pixel region is immediately surrounded by one of said black matrixes.

* * * * *